United States Patent

Yasuhara

(10) Patent No.: US 9,350,900 B2
(45) Date of Patent: May 24, 2016

(54) INFORMATION PROCESSING APPARATUS, AND USER AUTHENTICATION METHOD FOR INFORMATION PROCESSING APPARATUS

(75) Inventor: Hiroshi Yasuhara, Roslyn Heights, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 13/698,252

(22) PCT Filed: May 30, 2011

(86) PCT No.: PCT/JP2011/002997
§ 371 (c)(1),
(2), (4) Date: Nov. 15, 2012

(87) PCT Pub. No.: WO2011/155151
PCT Pub. Date: Dec. 15, 2011

(65) Prior Publication Data
US 2013/0061319 A1 Mar. 7, 2013

(30) Foreign Application Priority Data

Jun. 9, 2010 (JP) .................................. 2010-132130

(51) Int. Cl.
*G06F 21/31* (2013.01)
*G06F 21/41* (2013.01)
(Continued)

(52) U.S. Cl.
CPC .............. *H04N 1/4433* (2013.01); *G06F 21/41* (2013.01); *G06F 21/608* (2013.01); *H04L 9/3226* (2013.01); *H04L 63/0815* (2013.01); *H04N 1/00413* (2013.01); *H04N 1/4413* (2013.01); *G06F 2221/2141* (2013.01); *H04L 2209/60* (2013.01); *H04N 2201/0094* (2013.01)

(58) Field of Classification Search
CPC ..... H04L 63/0815; H04L 63/20; H04L 63/08; G06F 21/12; G06F 21/31; G06F 21/41; G06F 21/608; G06F 21/1222; G06F 21/1238; G06F 21/1288

USPC ............................................ 726/4, 17–19, 21
See application file for complete search history.

(56) References Cited

U.S. PATENT DOCUMENTS 7,540,020 B1 * 5/2009 Biswas et al. ...................... 726/6
2003/0177188 A1 * 9/2003 Brubacher et al. ............. 709/206
(Continued)

FOREIGN PATENT DOCUMENTS

JP   8-263417 A   10/1996
JP   2003-345751 A   12/2003
(Continued)

*Primary Examiner* — Joseph P Hirl
*Assistant Examiner* — Kalish Bell
(74) *Attorney, Agent, or Firm* — CANON USA, INC. IP Division

(57) ABSTRACT

An information processing apparatus to execute an application includes first and second authentication units, first and second storage units, a request unit, and an application execution unit. The first authentication unit authenticates a user of the information processing apparatus. The first storage unit stores first certification information relating to the authentication of a user. The request unit requests a second authentication unit to perform authentication required to execute the application using the first certification information when the application is executed based on an instruction from the user authenticated by the first authentication unit. The application execution unit executes the application when the authentication performed by the second authentication unit based on the request by the request unit has succeeded. The second storage unit stores second certification information relating to the second authentication unit authentication required to execute the application after associating the second certification information with the first certification information.

13 Claims, 9 Drawing Sheets

(51) Int. Cl.
*G06F 3/12* (2006.01)
*H04N 1/44* (2006.01)
*G06F 21/60* (2013.01)
*H04L 29/06* (2006.01)
*H04N 1/00* (2006.01)
*H04L 9/32* (2006.01)

(56) References Cited

U.S. PATENT DOCUMENTS

2004/0128393 A1* 7/2004 Blakley et al. ............... 709/229
2007/0079360 A1* 4/2007 Roberts et al. ................ 726/4
2007/0226783 A1* 9/2007 Mimlitsch ..................... 726/4
2008/0094655 A1* 4/2008 Nagai .......................... 358/1.15
2008/0289021 A1* 11/2008 Chandrasekhar et al. ......... 726/9
2011/0055912 A1* 3/2011 Fusari et al. .................. 726/8
2011/0083137 A1* 4/2011 Kashioka ..................... 719/315
2011/0265144 A1* 10/2011 Ikeda et al. ................... 726/3

FOREIGN PATENT DOCUMENTS

| | | |
|---|---|---|
| JP | 2006-134301 A | 5/2006 |
| JP | 2007-048282 A | 2/2007 |
| JP | 2007-219935 A | 8/2007 |

* cited by examiner

FIG. 4A
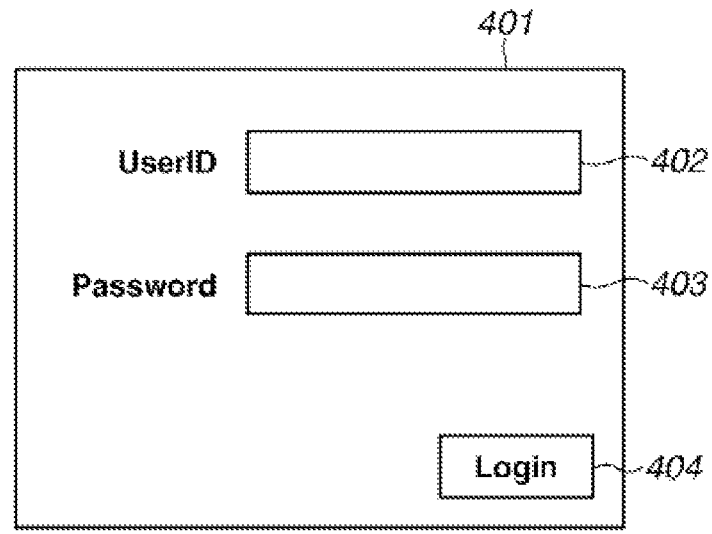
FIG. 4B
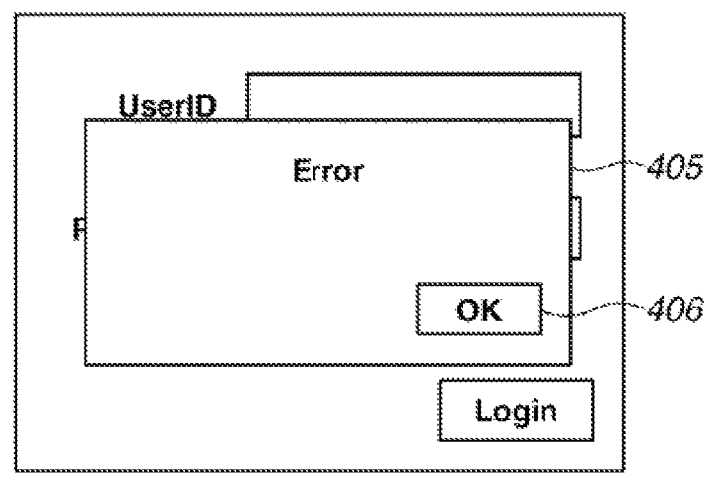
FIG. 5A
| SessionA | UserName | UserAttribute | Credential1 | Credential2 |
| --- | --- | --- | --- | --- |
| 501 | 502 | 503 | 504 | 505 |

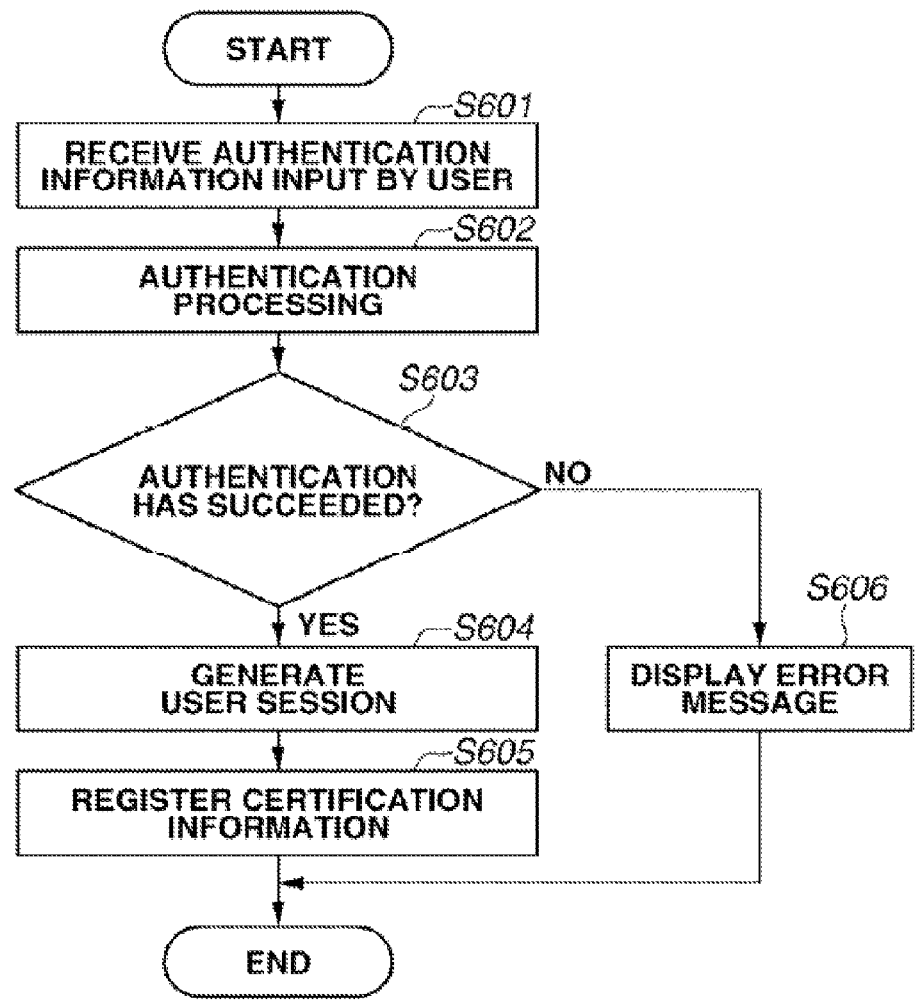

INFORMATION PROCESSING APPARATUS, AND USER AUTHENTICATION METHOD FOR INFORMATION PROCESSING APPARATUS

CROSS REFERENCE TO RELATED APPLICATIONS

This application is a National Stage filing of PCT application No. PCT/JP2011/002997, filed May 30, 2011, which claims priority from Japanese Patent Application No. 2010-132130, filed Jun. 9, 2010, all of which are hereby incorporated by reference herein in their entirety.

TECHNICAL FIELD

The present invention relates to an information processing apparatus including a user authentication function.

BACKGROUND ART

In recent years, functions of an image processing apparatus which is one of information processing apparatuses have been diversified, and a user authentication function has been widely used. The user authentication function is a function of identifying a user who uses the image processing apparatus. The user authentication function can request the user who uses the image processing apparatus to input certification information and can permit the user to use the image processing apparatus when authentication has succeeded.

Further, the image processing apparatus can execute a job in cooperation with a network resource (a file server and an electronic mail (e-mail) server). When such a job is executed, user authentication in the image processing apparatus and user authentication for using the network resource are required. In such a case, a technique for enabling the user to complete input of a user identification (ID) and a password at one time by single sign-on has been known.

For example, PTL 1 discusses using information registered once by a user when authentication is required again using log-on data to a local computer and another log-on data being cached to implement the single sign-on. This reduces time and labor for the user to input the same certification information a plurality of times and implements the single sign-on.

CITATION LIST

Patent Literature

PTL 1: Japanese Patent Application Laid-Open No. 8-263417

SUMMARY OF INVENTION

Technical Problem

In the method discussed in PTL 1, sets of user names and passwords of a plurality of users need to be stored in a storage device to implement single sign-on. A large number of memory resources are required to store such information.

Solution to Problem

The present invention is directed to an information processing apparatus capable of implementing single sign-on without requiring a large number of memory resources.

According to an aspect of the present invention, an information processing apparatus capable of executing an application includes a first authentication unit configured to authenticate a user of the information processing apparatus, a first storage unit configured to store first certification information relating to the authentication by the first authentication unit, a request unit configured to request a second authentication unit to perform authentication required to execute an application using the first certification information stored in the first storage unit when the application is executed based on an instruction from the user authenticated by the first authentication unit, an application execution unit configured to execute the application when the authentication performed by the second authentication unit based on the request by the request unit has succeeded, and a second storage unit configured to store second certification information relating to the authentication by the second authentication unit after associating the second certification information with the first certification information.

Further features and aspects of the present invention will become apparent from the following detailed description of exemplary embodiments with reference to the attached figures.

BRIEF DESCRIPTION OF DRAWINGS

The accompanying figures, which are incorporated in and constitute a part of the specification, illustrate exemplary embodiments, features, and aspects of the invention and, together with the description, serve to explain the principles of the invention.

FIG. 4A illustrates an example of an operation screen displayed when the image processing apparatus according to an exemplary embodiment of the present invention performs user authentication.

FIG. 4B illustrates an example of an operation screen displayed when the image processing apparatus according to an exemplary embodiment of the present invention performs user authentication.

FIG. 5A illustrates an example of user session information in an exemplary embodiment of the present invention.

FIG. 5B illustrates an example of user session information in an exemplary embodiment of the present invention.

FIG. 6 is a flowchart illustrating an example of user authentication processing performed by a user authentication module 310.

DESCRIPTION OF EMBODIMENTS

Various exemplary embodiments, features, and aspects of the invention will be described in detail below with reference to the figures.

In the present exemplary embodiment, an image processing apparatus, which is one of information processing apparatuses, will be described by an example.

EXAMPLE 1

Figure 1:
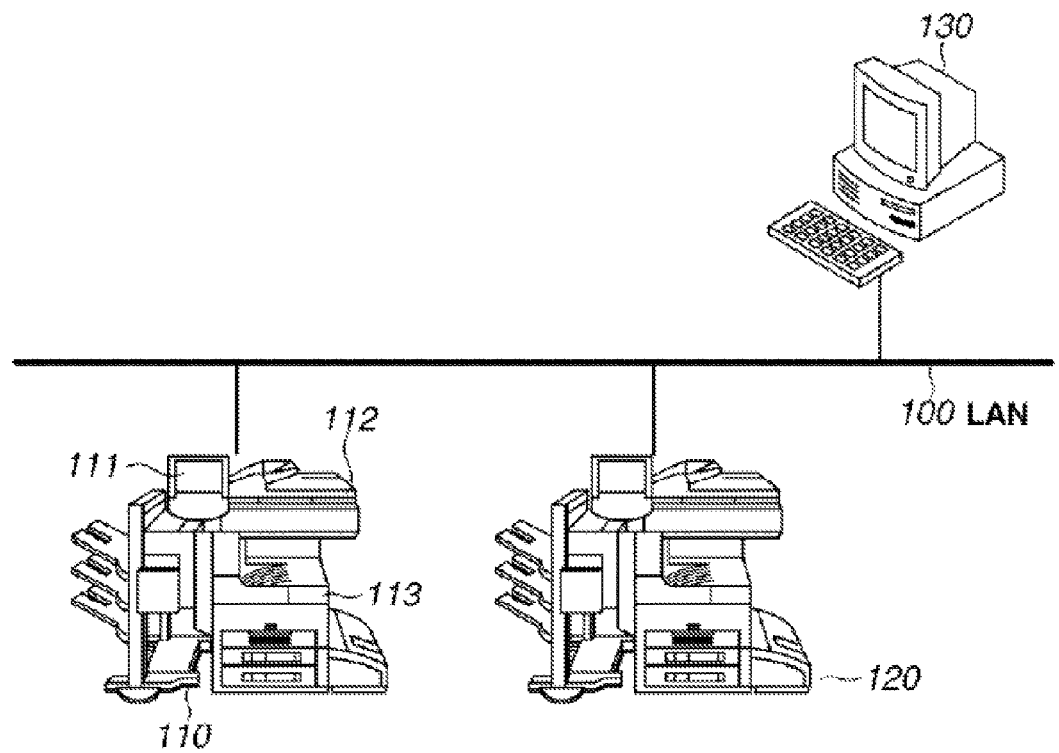
FIG. 1 is a block diagram illustrating an example of an overall configuration of a system including image processing apparatuses.

FIG. 1 is a block diagram illustrating an example of an overall configuration of a system including image processing apparatuses according to the present exemplary embodiment.

An image processing apparatus 110 and an image processing apparatus 120 each have a copying function. The image processing apparatus 110 and the image processing apparatus 120 each have an image data storage device for storing image data obtained by reading a document image (also referred to as document data) in an inner storage. Further, the image processing apparatus 110 and the image processing apparatus 120 each have a data acquisition function to acquire image data from a designated apparatus on a local area network (LAN) 100.

The image processing apparatus 110 and the image processing apparatus 120 each have a printing function to print acquired image data. Further, the image processing apparatus 110 and the image processing apparatus 120 each have an image data sending function, in response to an image data acquisition request from an information processing apparatus 130 on the LAN 100 or another image processing apparatus, to send the image data stored in the image data storage device to another information processing apparatus via the LAN 100.

The image processing apparatus 110 and the image processing apparatus 120 each are a multi-functional peripheral (MFP) having a plurality of functions, as described above.

Figure 2:
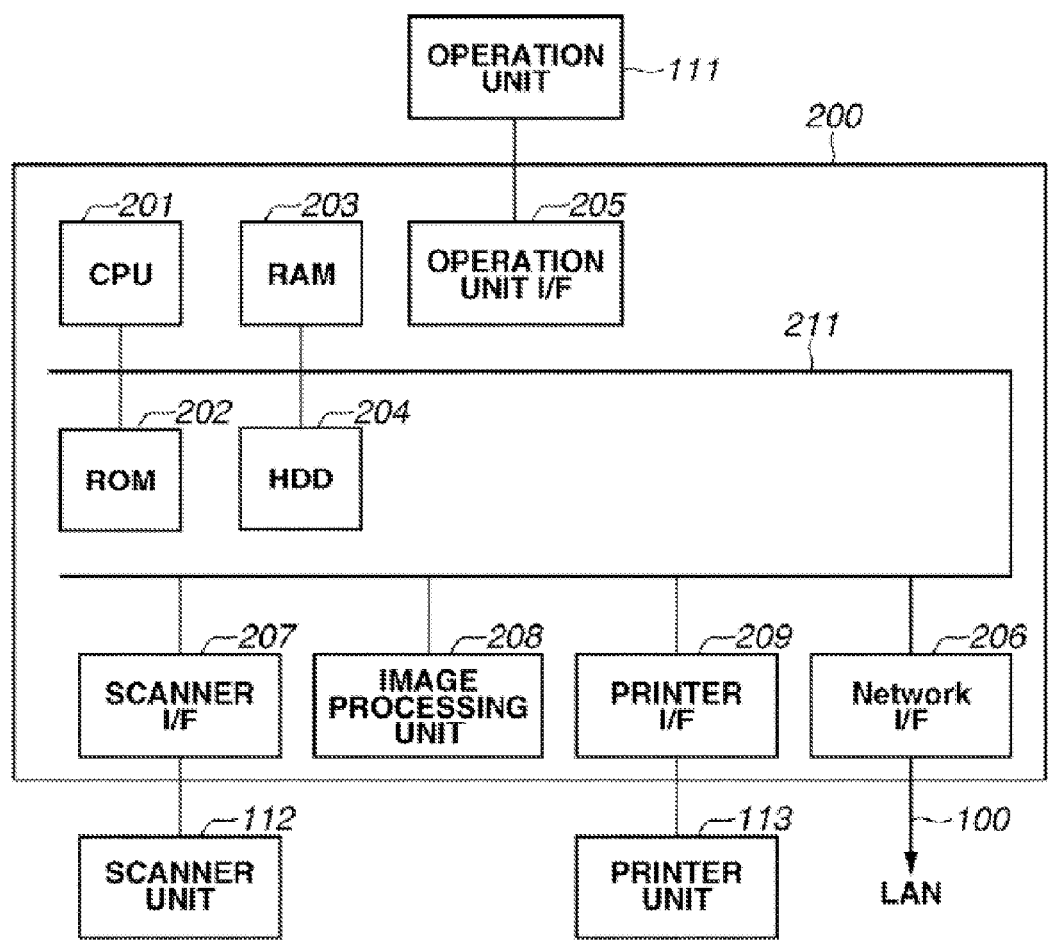
FIG. 2 illustrates an example of a hardware configuration of each of an image processing apparatus 110 and an image processing apparatus 120.

FIG. 2 illustrates an example of a hardware configuration of each of the image processing apparatus 110 and the image processing apparatus 120.

The image processing apparatus 110 and the image processing apparatus 120 each include components illustrated in FIG. 2. The image processing apparatus 110 and the image processing apparatus 120 respectively have similar configurations. While the image processing apparatus 110 is described as an example, the description also applies to the image processing apparatus 120.

The image processing apparatus 110 includes a scanner unit 112 serving as an image input device, a printer unit 113 serving as an image output device, a controller 200 for controlling the image processing apparatus 110, and an operation unit 111.

The scanner unit 112 reads an image on a document, to generate image data. The printer unit 113 forms an image of image data received from the controller 200 on a sheet. While an electrophotographic system using a photosensitive drum and a photosensitive belt is used as an image forming system of the printer unit 113 in the present exemplary embodiment, the present invention is not limited to this. For example, an inkjet system may be used.

The controller 200 is electrically connected to the operation unit 111, the scanner unit 112, and the printer unit 113 while being connected to the LAN 100 via a network interface (I/F) 206. More specifically, the controller 200 is connected to another device via the LAN 100. This enables communication via a network.

A central processing unit (CPU) 201 integrally controls access to various types of devices that are being connected to the image processing apparatus 110 and access from another device based on control programs stored in a read only memory (ROM) 202 or a hard disk drive (HDD) 204. The CPU 201 integrally controls various types of processing performed by the image processing apparatus 110.

This control also includes execution of a program for implementing flowcharts, described below. In the present exemplary embodiment, one CPU 201 controls the image processing apparatus 110. However, the present invention is not limited to this. The controller 200 may include a plurality of CPUs.

The ROM 202 stores a program (including a boot program) for controlling the image processing apparatus 110. A random access memory (RAM) 203 is a system work memory for the CPU 201 to operate, and is also a memory for temporarily storing image data. The RAM 203 includes an area where a content stored by power backup is also retained after power supplied to an apparatus main body is turned off and an area where a stored content is erased after the power is turned off.

The HDD 204 stores application software, system software, image data, and certification information for authenticating a user. The HDD 204 may be replaced with a solid state drive (SDD).

An operation unit I/F 205 is an interface unit for connecting a system bus 211 and the operation unit 111. The operation unit I/F 205 receives image data such as an operation screen to be displayed on a display unit provided in the operation unit 111 from the system bus 211, and outputs the image data to the operation unit 111. Operation information input from a touch panel or a hard key provided in the operation unit 111 is output to the system bus 211.

The network I/F 206 is connected to the LAN 100 and the system bus 211, and inputs and outputs information via the LAN 100.

A scanner I/F 207 performs correction processing, modulation processing, and editing processing for the image data received from the scanner unit 112. The scanner I/F 207 has a function of determining whether the received image data is a color document, a monochrome document, a text document, or a photographic document.

An image processing unit 208 performs orientation conversion, image compression, and decomposition processing of the image data. The image processing unit 208 synthesizes images stored in the HDD 204 into a single image. A printer I/F 209 receives the image data sent from the image processing unit 208, and subjects the image data to image formation while referring to attribute data appended to the image data. The image data after the image formation is output to the printer unit 113.

While the image processing apparatus 110 itself includes the operation unit 111 in the present exemplary embodiment, a general-purpose scanner and a general-purpose printer may be connected to a computer apparatus.

Figure 3:
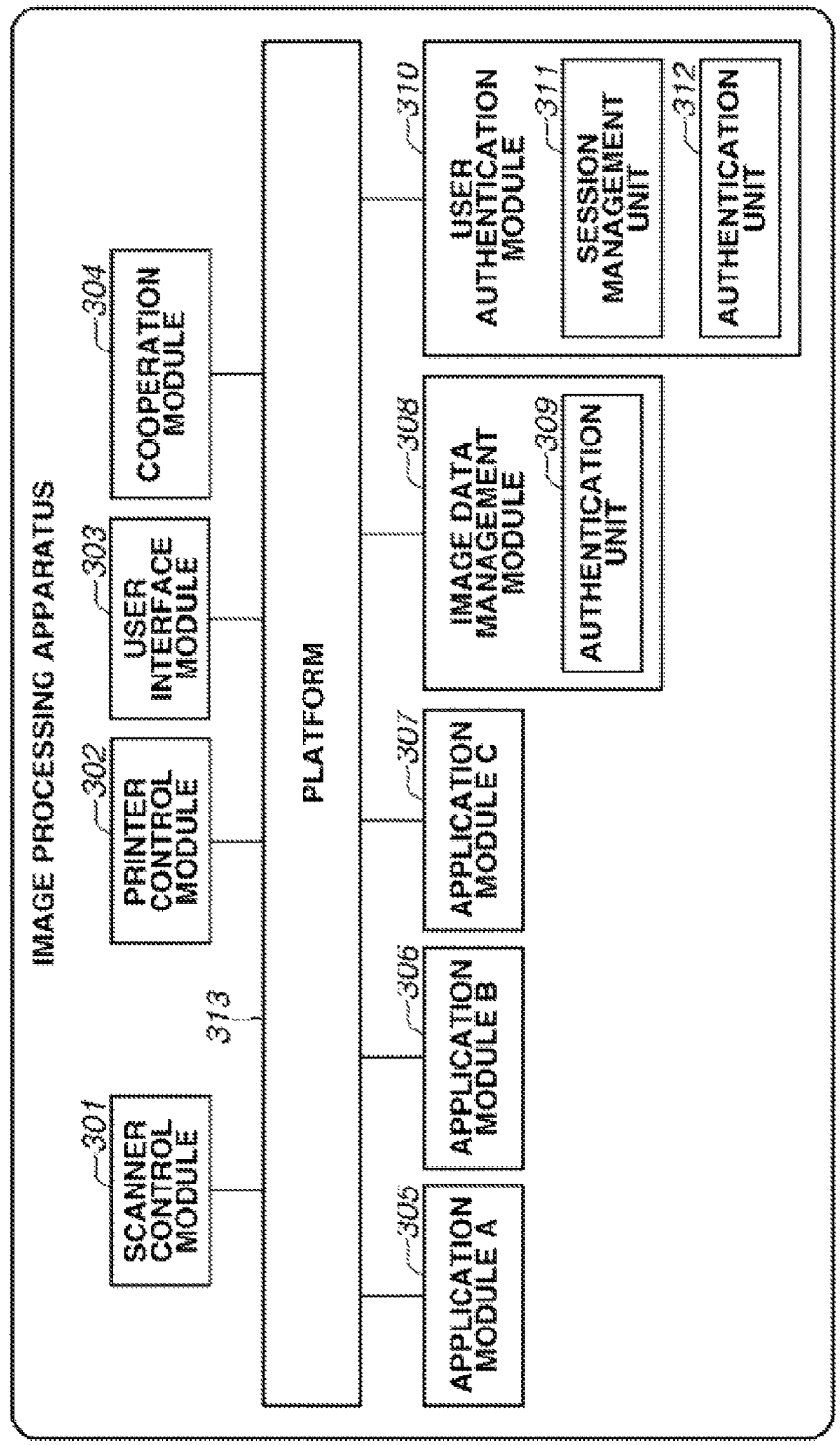
FIG. 3 is a block diagram illustrating an example of a software module configuration of an image processing apparatus.

FIG. 3 illustrates an example of a configuration of software modules in the image processing apparatus 110 according to the present exemplary embodiment. The software modules are stored in the HDD 204 in the image processing apparatus 110, and are executed by the CPU 201.

A scanner control module 301 controls the scanner unit 112 via the scanner I/F 207. A printer control module 302 controls the printer unit 113 via the printer I/F 209. A user interface module 303 controls the operation unit 111 via the operation unit I/F 205, to accept an instruction from the user and display an operation screen to the user.

A cooperation module 304 is a software module for operating the network I/F 206, to perform communication with another image processing apparatus and another computer apparatus.

An application module A 305, an application module B 306, and an application module C 307 cooperate with another software module on the image processing apparatus 110, to perform image processing. The image processing apparatus 110 can execute jobs by executing the application modules. The CPU 201 predominantly executes the application modules. The application modules can be added (installation) and deleted (uninstallation). The addition and the deletion can be performed via the cooperation module 304.

An image data management module 308 performs processing relating to storage of data (image data and various types of data other than the image data) in the HDD 204 and acquisition of data from the HDD 204.

The image data management module 308 includes an authentication unit 309 for performing management of certification information and authentication processing, and performs the authentication processing when the image data is acquired and stored. Only when the authentication processing has succeeded, access to the image data is allowed.

A user authentication module 310 performs processing relating to user authentication. When the authentication processing has succeeded by the user authentication module 310, a session management unit 311 generates user session information. The user can use a function of the image processing apparatus 110.

The session management unit 311 manages the user section information. In a period elapsed since the user logged into the image processing apparatus 110 until the user logs out thereof, information such as a user attribute of the user who is logging in is retained. The user authentication module 310 provides the user session information to other software modules. Details of the user session information will be described below.

A platform 313 performs processing for causing the software modules to corporate with one another.

The authentication unit 309 stored in the image data management module 308 and an authentication unit 312 stored in the user authentication module 310 are respectively different authentication modules, and also differ in user information to be managed. Information that has been successfully authenticated by the authentication unit 312 may be unsuccessfully authenticated by the authentication unit 309.

The image processing apparatus 110 according to the present exemplary embodiment can replace (install or uninstall) the authentication module. The image processing apparatus 110 can perform management using various authentication methods by replacing the authentication module.

The authentication module is replaced via the cooperation module 304. The present invention does not limit a processing content of replacement processing. Therefore, details of the processing are not described. However, a basic configuration of the section management unit 311 and the authentication unit is not changed even if the authentication module is replaced.

FIGS. 4A and 4B respectively illustrate examples of operation screens displayed when the image processing apparatus according to the present exemplary embodiment performs user authentication.

FIG. 4A illustrates an example of a user authentication screen 401 displayed on the operation unit 111 in the image processing apparatus 110. The user authentication screen 401 includes a user ID input field 402, a password input field 403, and an authentication button (log-in button) 404. When the user authentication module 310 performs user authentication, it displays the user authentication screen 401 on the operation unit 111 if the session management unit 311 does not include user session information relating to a user who is operating the operation unit 111.

The user inputs a user ID and a password, respectively, to the user ID input field 402 and the password input field 403, and presses the authentication button 404. The user authentication module 310 performs authentication processing based on the user ID and the password, which the user has input to the authentication screen 401. When the authentication has succeeded, the image processing apparatus 110 is allowed to be operated. When the user logs out of the image processing apparatus 110, the user authentication screen 401 is displayed again.

FIG. 4B illustrates an example of a user authentication error screen displayed on the operation unit 111 in the image processing apparatus 110. The user authentication error screen is displayed on the operation unit 111 when the user authentication module 310 determines that an authentication error has occurred. The user authentication error screen includes an error dialog 405 and an OK button 406. An error message is displayed on the error dialog 405, and a content of the error is notified to the user. When the user presses the OK button 406, the user authentication screen 401 is displayed again.

The user authentication screen 401 according to the exemplary embodiment of the present invention is not limited to those illustrated in FIGS. 4A and 4B. A screen configuration, input information, authentication timing, and so on may be other configurations. For example, user authentication may be performed when a particular function of the image processing apparatus 110 is selected. When a user authentication module replaced by another authentication method (e.g., authentication using an IC card or biometric authentication) is used, a user authentication screen different from the user authentication screen 401 is displayed depending on an authentication method.

FIGS. 5A and 5B illustrate an example of user session information in the present exemplary embodiment.

FIG. 5A illustrates an example of a configuration of the user session information managed by the session management unit 311 in the user authentication module 310. The user session information includes information 501 to 505.

The session information 501 is generated when the authentication unit 312 in the user authentication module 310 authenticates a user. The user identifier 502 is an identifier for uniquely specifying a user who has logged in. For example, the user identifier 502 may be a user ID input by the user ID input field 402 in the user authentication screen 401. The user attribute information 503 is attribute information relating to a user who has logged in, for example, attribute information relating to an e-mail address or a display name (name) of the user who has logged in.

As the first certification information 504, identification information relating to an authentication method, together with the user ID and the password which the user has input when using the image processing apparatus 110, for example, is stored. As the second certification information 505, authentication information which the user has input to the user interface module 303 to perform authentication for an external user authentication device required for the user to access another image processing apparatus or another information processing apparatus.

The user authentication module 310 authenticates the user by implementing a flowchart illustrated in FIG. 6, described below, so that user session information including the information 501 to 504 is generated. When the authentication unit 309 authenticates the user by implementing a flowchart illustrated in FIG. 7, the second certification information 505 is added to the user session information including the information 501 to 504. The number of certification information is not limited to two (information 504 and 505). The number can be changed.

Generation and deletion of the user session information and the certification information will be described in detail with reference to FIG. 6.

FIG. 5B illustrates an example of a configuration of the first certification information 504 and the second certification information 505 illustrated in FIG. 5A. A user ID 506 is a user identifier used for authentication. A password 507 is used for authentication. An authentication module flag 508 is information indicating whether the certification information is generated by the user authentication module 310 in the image processing apparatus 110.

The authentication module flag 508 stores information TRUE and information FALSE, respectively, when the user authentication module 310 generates and does not generate the certification information. An authentication method 509 is information for identifying a method for user authentication.

For example, in authentication by collation of a user ID and a password, information "BASIC" is stored. If certification information is used in authentication by another authentication protocol, e.g., a challenge and response method via a server, information "CR" is stored.

FIG. 6 is a flowchart illustrating an example of user authentication processing performed by the user authentication module 310 in the image processing apparatus 110 according to the present exemplary embodiment. The CPU 201 in the image processing apparatus 110 executes the user authentication module 310 so that processes in the flowchart are performed. The flowchart starts in a state where a user logs out of the image processing apparatus 110, and the user authentication screen 401 illustrated in FIG. 4A is displayed on the operation unit 111.

In step S601, the user interface module 303 receives authentication information (a user ID, a password, etc.) input via the operation unit 111 by the user. The user authentication module 310 receives the authentication information.

In step S602, the CPU 201 causes the authentication unit 312 to perform authentication processing using the authentication information received in step S601. More specifically, the CPU 201 confirms whether the received user ID exists, and collates the user ID with the password when the user ID exists. In the present exemplary embodiment, a case where an authentication method is performed by collation of the user ID and the password will be described as an example. If the user authentication module 310 supports another authentication method, however, a content of authentication information and a content of authentication processing differ depending on the authentication method.

In step S603, the CPU 201 determines whether the authentication processing in step S602 has succeeded. It is determined that the authentication has succeeded if the collation in step S602 has succeeded. On the other hand, it is determined that the authentication has failed if the collation has failed or the user ID does not exist. If it is determined that the authentication has succeeded (YES in step S603), the processing proceeds to step S604. If it is determined that the authentication has failed (NO in step S603), the processing proceeds to step S606.

In step S604, the CPU 201 generates user session information. More specifically, a record serving as user session information is generated in a session management table managed by the session management unit 311. The authentication unit 312 issues a session ID, and stores the session ID in the session information 501.

The user ID received in step S601 is stored as the user identifier 502. A user attribute stored together with the user ID and the password in the authentication unit 312 is stored in the user attribute information 503.

Step 605 is a certification information registration step, in which the CPU 201 stores the user ID and the password serving as the authentication information used in the authentication processing step in step S602, respectively, in the user ID 506 and the password 507 serving as the certification information illustrated in FIG. 5B. Further, information for identifying an authentication method is stored in the authentication method 509, and information indicating whether authentication has been performed by the user authentication module 310 in the image processing apparatus 110 is stored in the authentication module flag 508.

In the present exemplary embodiment, identification information "BASIC" indicating that an authentication method is performed by collation of a user ID and a password is stored in the authentication method 509. Further, the authentication module 310 generates the certification information. Therefore, the authentication module flag 508 stores information TRUE.

A display content of the operation unit 111 is switched to a screen (not illustrated) for accepting an operation of the image processing apparatus 110 from the user authentication screen illustrated in FIG. 4A. The user authentication module 310 authenticates the user, so that the user logs into the image processing apparatus 110.

Step S606 is an error message display step, in which the CPU 201 displays the user authentication error screen illustrated in FIG. 4B on the operation unit 111.

In the foregoing steps, after the user authentication succeeds, and the user session information and the certification information are registered, the user can use each of functions of the image processing apparatus 110 via the operation unit 111.

Figure 7:
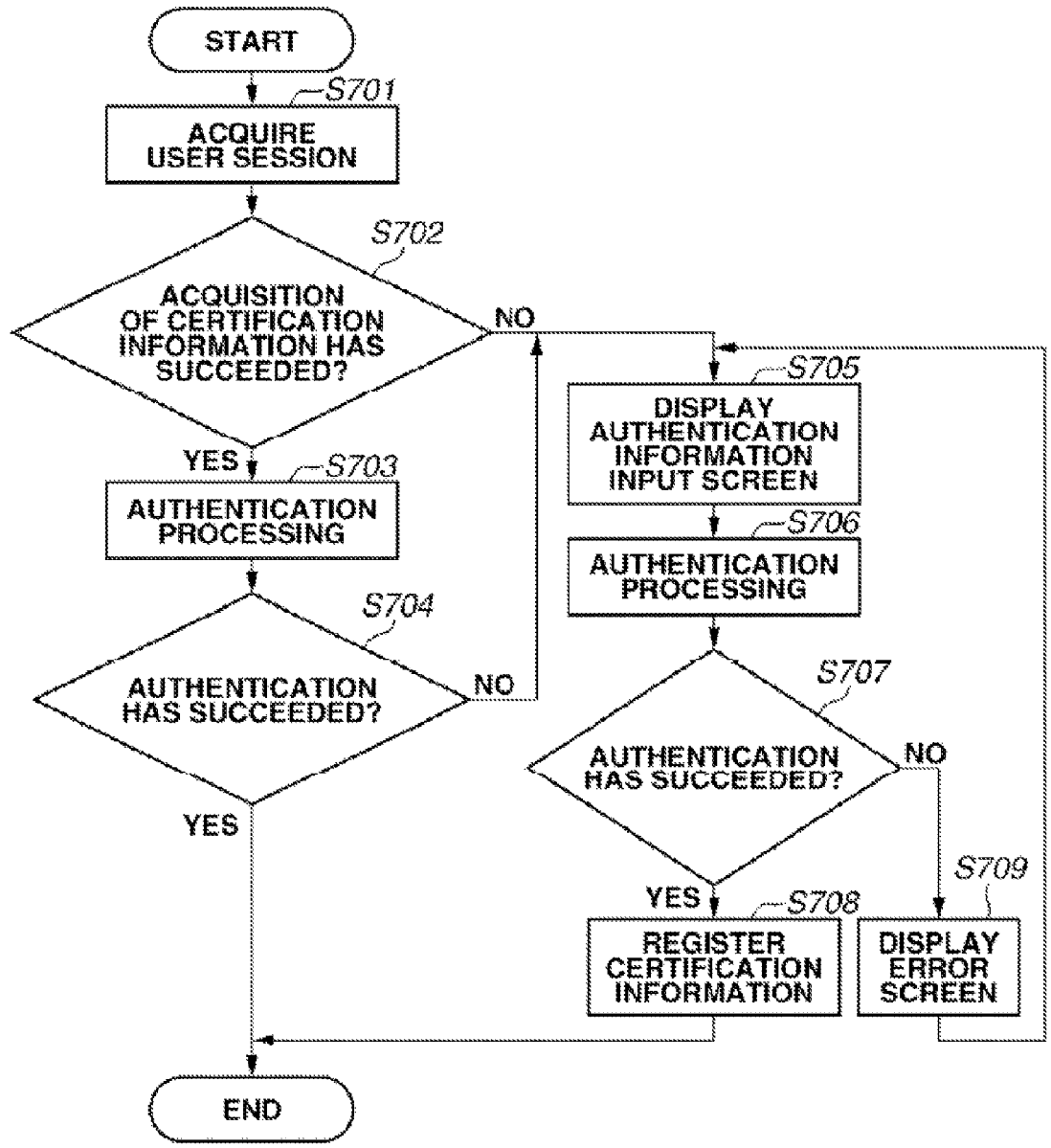
FIG. 7 is a flowchart illustrating an example of authentication processing and certification information registration processing in the image processing apparatus according to an exemplary embodiment of the present invention.

FIG. 7 is a flowchart illustrating an example of authentication processing and certification information registration processing in the image processing apparatus 110 according to the present exemplary embodiment.

In the present exemplary embodiment, the application module A 305 has a function of acquiring image data from the image data management module 308, performing image processing for the acquired image data, and outputting image data via the printer control module 302.

The image data management module 308 includes the authentication unit 309. A user authenticated by the authentication unit 309 can access the image data managed by the image data management module 308. When a user who has been authenticated by the user authentication module 310 and can operate the image processing apparatus 110 uses the application module A 305, user authentication by the authentication unit 309 is required this time.

The flowchart illustrated in FIG. 7 describes authentication processing performed when the application module A 305 acquires an image from the image data management module 308 and processing relating to registration of certification information. Processes in the flowchart are started when the user authenticated by the user authentication module 310 instructs the application module A 305 to perform the processes.

In step S701, the application module A 305 acquires user session information relating to a user who is currently logging in from the session management unit 311 in the user authentication module 310. Then, the processing proceeds to step S702.

In step S702, the application module A 305 determines whether the first certification information 504 included in the acquired session information can be used. Details of the determination in step S702 will be described with reference to a flowchart illustrated in FIG. 9. If it is determined that the first certification information 504 can be used (YES in step S702), the processing proceeds to step S703. If it is determined that the first certification information 504 cannot be used (NO in step S702), the processing proceeds to step S705.

In step S703, the application module A 305 notifies the acquired first certification information 504 to the authentication unit 309. The authentication unit 309 uses the notified first certification information 504, to perform authentication processing. More specifically, the authentication unit 309 confirms whether a user ID contained in the first certification information 504 is registered in the authentication unit 309. If the user ID exists, a password is collated. Then, the processing proceeds to step S704.

In step S704, the application module A 305 determines whether the authentication processing in step S703 by the authentication unit 309 has succeeded. If it is determined that the authentication has failed (NO in step S704), the application module A 305 deletes the first certification information 504 acquired in step S702, and the processing proceeds to step S705. If it is determined that the authentication has succeeded (YES in step S704), the flowchart ends.

In step S705, the application module A 305 displays a similar screen to the user authentication screen 401 illustrated in FIG. 4A on the operation unit 111 via the user interface module 303, and accepts input of authentication information (e.g., a user ID and a password) by the user. Then, the processing proceeds to step S706.

In step S706, the application module A 305 notifies the authentication information accepted in step S705 to the authentication unit 309. The authentication unit 309 performs authentication processing based on the notified authentication information. More specifically, the authentication unit 309 confirms whether the accepted user ID is registered in the authentication unit 309, and collates the password when the user ID exists. Then, the processing proceeds to step S707.

In step S707, the application module A 305 determines whether the authentication processing in step S706 by the authentication unit 309 has succeeded. If it is determined that the authentication processing has succeeded (YES in step S707), the processing proceeds to step S708. If it is determined that the authentication processing has failed (NO in step S707), the processing proceeds to step S709.

In step S708, the application module A 305 generates the second certification information 505 illustrated in FIG. 5B, and stores the user ID and the password serving as the authentication information used in the authentication processing in step S706, respectively, in the user ID 506 and the password 507 in the second certification information 505.

Further, information for identifying an authentication method is stored in the authentication method 509, and information indicating whether the user authentication module 310 in the image processing apparatus 110 authenticates the user is stored in the authentication module flag 508.

The user authentication module 310 does not generate the second certification information 505. Therefore, information FALSE is stored in the authentication module flag 508. The second certification information 505 is registered after being associated with the user session information.

When one or more certification information have already been registered by the user authentication module 310 and the other application, the second certification information 505 is added to the certification information. Then, the flowchart ends. The authentication unit 309 may generate the second certification information 505 in step S708 and notify the generated second certification information 505 to the application module A 305.

After the process in step S708 is performed, the application module A 305 can acquire an image managed by the image data management module 308, and perform output processing of the acquired image. The user authentication screen displayed in step S705 is made not to be displayed.

In step S709, the application module A 305 displays the user authentication error screen illustrated in FIG. 4B. When the OK button 406 is pressed, the processing proceeds to step S705 again.

In the flowchart illustrated in FIG. 7, the authentication unit 309 provided inside the image processing apparatus 110 performs the user authentication using the first certification information 504 registered by the authentication in the user authentication module 310. Thus, the user ID and the password need not be input for the authentication unit 309 to authenticate the user. Therefore, single sign-on can be implemented.

Further, the second certification information 505 generated when the authentication unit 309 authenticates the user is registered after being associated with the user session information. When the user needs to be authenticated later by an authentication unit (not illustrated) different from the user authentication module 310 and the authentication unit 309, user authentication processing using the second certification information 505 in addition to the first certification information 504 can be performed.

An apparatus outside the image processing apparatus 110, e.g., the image processing apparatus 120 or the information processing apparatus 130 may have a configuration corresponding to the image data management module 308. For example, the image data management module 308 may be provided in the image processing apparatus 120 or the information processing apparatus 130.

In this case, the processes in this flowchart apply to a case where another application such as the application module B 306 or the application module C 307 performs authentication processing when it accesses the image processing apparatus 120 or the information processing apparatus 130. In this case, a CPU in the image processing apparatus 120 or the information processing apparatus 130 performs processing to be performed by the image data management module 308.

Figure 8:
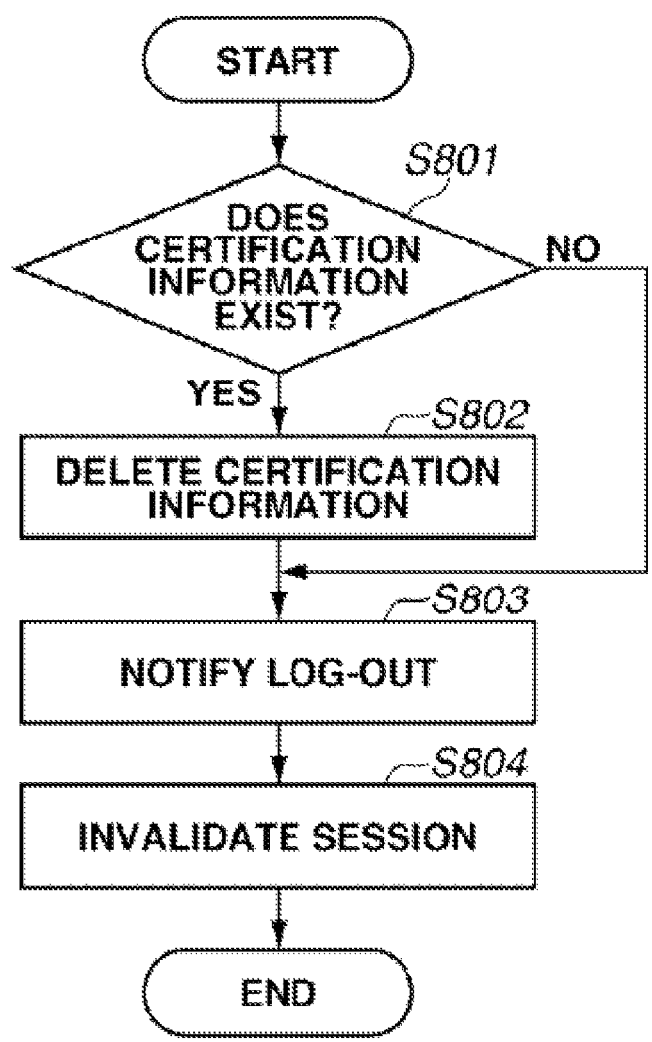
FIG. 8 is a flowchart illustrating an example of log-out processing by a user in the image processing apparatus according to an exemplary embodiment of the present invention.

FIG. 8 is a flowchart illustrating an example of log-out processing by a user in the image processing apparatus 110 according to the present exemplary embodiment.

After the user logs into the image processing apparatus 110 by implementing the flowchart illustrated in FIG. 6, and the image processing apparatus 110 ends a series of processes such as output of an image based on an instruction from the user who has logged in, the flowchart starts when the user gives a log-out instruction.

More specifically, the authentication module receives the log-out instruction from the user via the operation unit 111. The log-out instruction is sent to the user authentication module 310 via the user interface module 303, and the log-out processing is started as this flowchart in the session management unit 311. When a predetermined period of time has elapsed without the user operating the operation unit 111 after the user logs into the image processing apparatus 110, this flowchart may start for the user to automatically log out.

In step S801, the CPU 201 determines whether certification information (e.g., the first certification information 504 and the second certification information 505) is associated with user session information managed by the session management unit 311. If the certification information associated with the user session information is stored (YES in step S801), the processing proceeds to step S802. If the certification information associated with the user session information does not exist (NO in step S801), the processing proceeds to step S803.

In step S802, the CPU 201 deletes the certification information associated with the user session information. If there is a plurality of certification information associated with the user session information, the plurality of certification information is deleted. Then, the processing proceeds to step S803.

In step S803, the user authentication module 310 notifies via the platform 313 an associated software module (e.g., any one of the application modules A to C and the image data management module 308) that a user has logged out. Then, the processing proceeds to step S804.

In step S804, the user authentication module 310 deletes session information relating to the user who has logged out. Then, this flowchart ends.

According to the flowchart illustrated in FIG. 8, the certification information relating to the user who has logged out, together with the session information, is deleted. Therefore, the image processing apparatus 110 need not store the certification information relating to the user until after the user has logged out.

In an apparatus for implementing single sign-on by a general key ring method, certification information relating to a plurality of users need to be previously stored in a storage device. Therefore, the storage device requires a large-capacity storage area for storing the certification information. On the other hand, the image processing apparatus 110 according to the present exemplary embodiment does not require such a large-capacity storage device.

When a predetermined period of time during which the user does not operate the image processing apparatus 110 while the first certification information 504 and the second certification information 505 are registered in the user session information has elapsed, the second certification information 505 may be deleted from the user session information. Then, the processing illustrated in FIG. 8 may be performed based on the log-out instruction.

Figure 9:
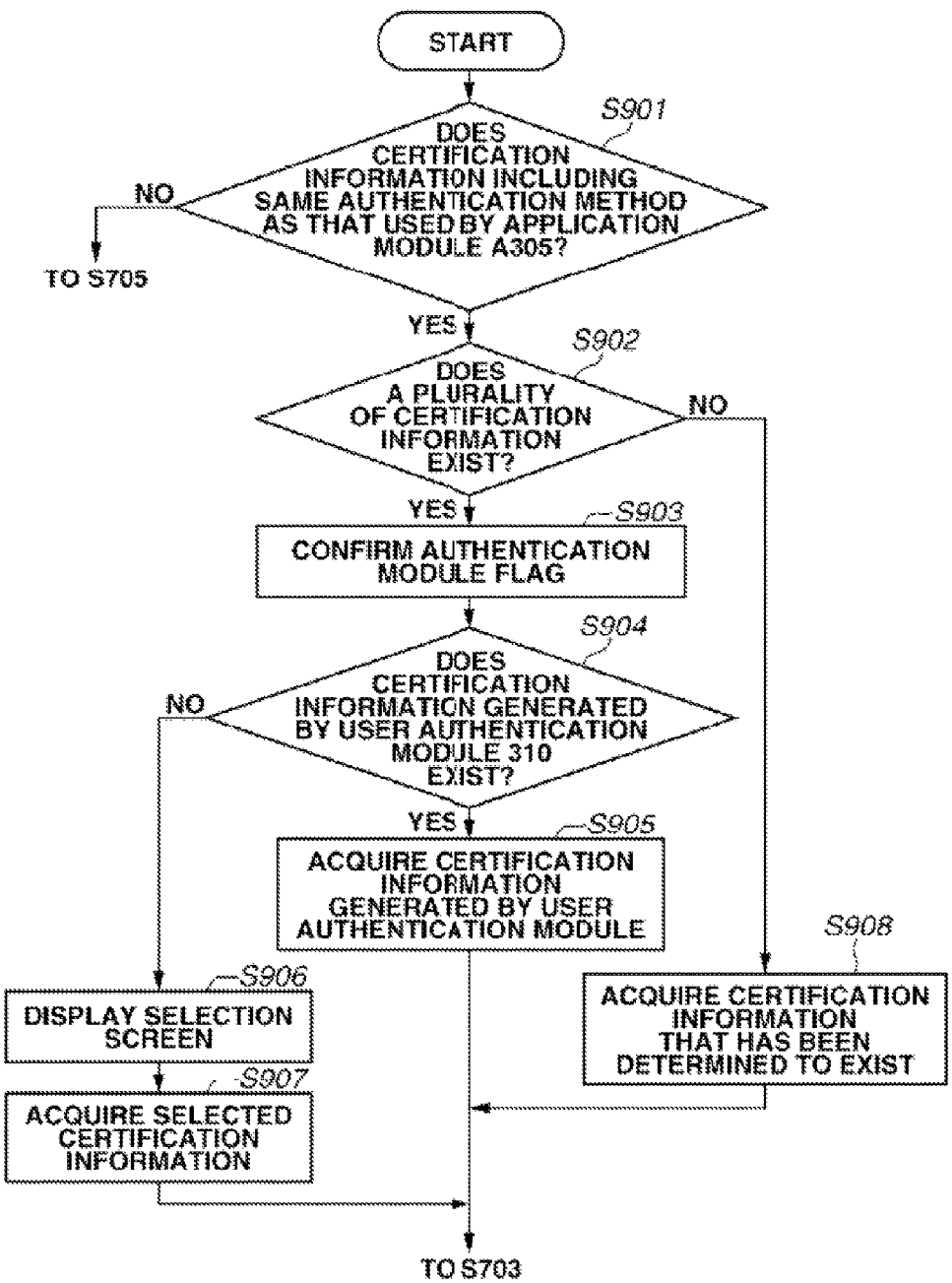
FIG. 9 is a flowchart illustrating details of determination whether certification information can be used in step S702 in the flowchart illustrated in FIG. 7.

FIG. 9 is a flowchart illustrating details of determination whether the certification information 504 can be used in step S702 in the flowchart illustrated in FIG. 7. The application module A 305 performs steps illustrated in FIG. 9.

In step S901, it is determined whether there exists certification information, stored in the authentication method 509, including the same authentication method as an authentication method used by the application module A 305.

In the present exemplary embodiment, an authentication method used when user authentication is performed is previously defined in each of the application modules (A to C). For example, the application module A 305 performs BASIC authentication.

If it is determined that the certification information does not exist (NO in step S901), the processing proceeds to step S705 illustrated in FIG. 7. Even if the certification information exists, it is determined that the certification information does not exist when the application module A 305 or the authentication unit 309 cannot access the certification information because it does not have access authority to the certification information, and the processing proceeds to step S705. On the other hand, if it is determined that the certification information exists (YES in step S901), the processing proceeds to step S902.

In step S902, the application module A 305 determines whether a plurality of certification information is determined to exist. If it is determined that a plurality of certification information is determined to exist (YES in step S902), the processing proceeds to step S903. If it is determined that not a plurality of but one certification information is determined to exist (NO in step S902), the processing proceeds to step S908.

In step S903, the application module A 305 searches the plurality of certification information that is determined to exist in step S901 for the certification information with TRUE being stored in the authentication module flag 508, i.e., the certification information generated by the user authentication module 310. This is because the certification information generated by the user authentication module 310 out of the plurality of certification information is to be preferentially used.

In step S904, the application module A 305 determines whether the certification information generated by the user authentication module 310 exists based on a retrieval result in step S903. If it is determined that the certification information exists (YES in step S904), the processing proceeds to step S905. If it is determined that the certification information does not exist (NO in step S904), the processing proceeds to step S906.

In step S905, the application module A 305 acquires the certification information generated by the user authentication module 310, and the processing proceeds to step S703 illustrated in FIG. 7.

Step S906 is a selection screen display step, in which the application module A 305 displays on the operation unit 111 an operation screen for selecting which of the plurality of certification information, which is determined to exist in step S901, is to be acquired, and accepts a selection instruction from the user. Information allowing the user to select appropriate certification information, e.g., the user ID 506 and the password 507, is displayed.

In step S907, the application module A 305 acquires the certification information selected by the user in step S906 from the user session information, and the processing proceeds to step S703 illustrated in FIG. 7.

In step S908, the apparatus module A 305 acquires the one certification information, which is determined to exist in step S901, and the processing proceeds to step S703 illustrated in FIG. 7.

Figure 10:
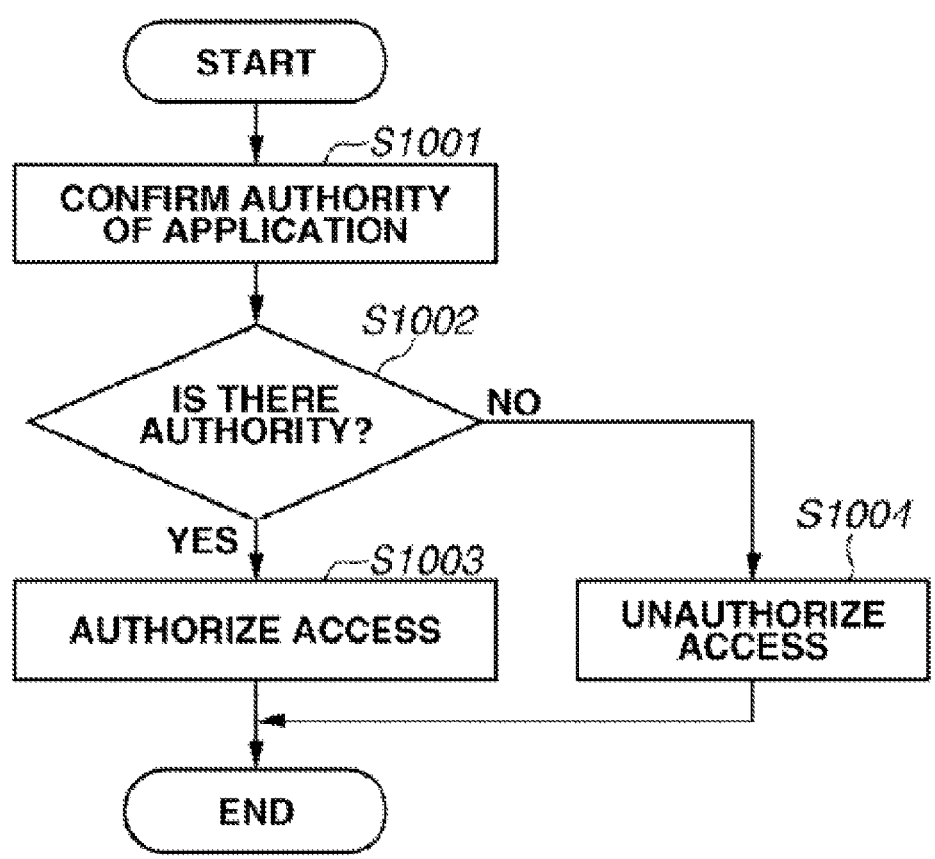
FIG. 10 is a flowchart illustrating an example of access control processing for certification information in the image processing apparatus according to an exemplary embodiment of the present invention.

FIG. 10 is a flowchart illustrating an example of access control processing for certification information in the image processing apparatus 110 according to the present exemplary embodiment.

In the processing in step S901 illustrated in FIG. 9 and the certification information registration processing in step S708 illustrated in FIG. 7, the authentication unit 309 is required to access a storage area storing the certification information managed by the session management unit 311. The session management unit 311 determines whether the authentication unit 309 is authorized to access the certification information depending on the type of the application module (A to C), which has requested the authentication unit 309 to perform user authentication. If it is determined that the authentication unit 309 is unauthorized to access the certification information, the access to the certification information is in error.

In step S1001, the CPU 201 confirms access authority of the application module for accessing certification information of the application module. In the present exemplary embodiment, it is confirmed whether particular authority is assigned to an execution process of the application module.

In step S1002, the CPU 201 determines whether the application module has access authority to the certification information based on a confirmation result in step S1001. If it is determined that there is no authority (NO in step S1002), the processing proceeds to step S1004. If it is determined that there is authority (YES in step S1002), the processing proceeds to step S1003.

Step S1003 is an access authorization step, in which the CPU 201 authorizes the application module to access the certification information, and this flowchart ends.

Step S1004 is an access unauthorization step, in which the CPU 201 unauthorizes the application module to access the certification information, and this flowchart ends.

The flowchart illustrated in FIG. 10 enables the application module to restrict the access to the certification information.

As described above, according to the present exemplary embodiment, first certification information generated and stored when the user authentication module 310 serving as an example of a first authentication unit authenticates a user is used so that another authentication apparatus serving as an example of a second authentication unit can authenticate the user. Thus, single sign-on can be implemented.

Second certification information generated when the other authentication device authenticates the user while the user authentication module 310 authenticates the user, is added to user session information and registered after being associated with the first certification information. This enables, while the user authentication module 310 authenticates the user, a different authentication apparatus to further authenticate the user using the added certification information. Thus, flexible single sign-on can be further implemented.

When the user logs out of the user authentication module 310, the first certification information and the second certification information are erased. This eliminates the necessity of previously registering key rings of a plurality of users in a storage device, like in a conventional single sign-on technique implemented by a key ring method. Accordingly, a storage capacity for registering key rings need not be secured, and time and labor required to previously register the key rings can be omitted.

As described above, the present invention has been described based on a preferred exemplary embodiment, the present invention is not limited to the present exemplary embodiment. Various modifications can be made within a scope of claims.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An information processing apparatus comprising:
a first authenticator configured to authenticate a user of the information processing apparatus to use a function of the information processing apparatus;
a processor configured to generate, in response to authentication of the user by the first authenticator succeeding, certification information that includes a user identification (ID) and authentication method information to identify an authentication method used by the first authenticator;
an application module configured to perform a process and to determine, in response to the user, authenticated by the first authenticator, instructing the application module to perform the process, whether the authentication method information matches an authentication method previously used by the application module;
a second authenticator configured to authenticate the user, authenticated by the first authenticator, to instruct the application module; and
an image data storage unit configured to store image data,
wherein, in response to the application module determining that the authentication method information matches an authentication method previously used by the application module, the second authenticator determines whether the user ID in the certification information is registered in the second authenticator,
wherein, in response to the second authenticator determining that the user ID is registered in the second authenticator, the second authenticator authenticates the user, authenticated by the first authenticator, to instruct the application module, and
wherein the application module processes the image data stored in the image data storage unit by accessing the image data storage unit based on an instruction from the user authenticated by the second authenticator.

2. The information processing apparatus according to claim 1, further comprising a deletion unit configured to delete the certification information as the user logs out of a state where the first authenticator authenticates the user.

3. The information processing apparatus according to claim 1, wherein, in a case where the application module cannot use the certification information, the application module issues a notification to prompt the user to input authentication information required for the authentication by the second authenticator.

4. The information processing apparatus according to claim 1, wherein the certification information includes authentication information used by the first authenticator to authenticate the user.

5. The information processing apparatus according to claim 1, wherein the certification information includes information indicating that the first authenticator authenticates the user.

6. The information processing apparatus according to claim 1, wherein the second authenticator is provided in the information processing apparatus.

7. The information processing apparatus according to claim 1, wherein the second authenticator is provided outside the information processing apparatus, and is configured to communicate with the information processing apparatus via a network.

8. A user authentication method in an information processing apparatus having a first authenticator, a processor, an application module configured to perform a process, a second authenticator configured to authenticate a user, authenticated by the first authenticator, to instruct the application module, and an image data storage unit, the user authentication method comprising:
- authenticating, via the first authenticator, the user of the information processing apparatus to use a function of the information processing apparatus;
- generating, via the processor and in response to authentication of the user by the first authenticator succeeding, certification information that includes a user identification (ID) and authentication method information to identify an authentication method used by the first authenticator;
- determining, via the application module and in response to the user, authenticated by the first authenticator, instructing the application module to perform the process, whether the authentication method information matches an authentication method previously used by the application module; and
- storing image data in the image data storage unit,
- wherein, in response to the application module determining that the authentication method information matches an authentication method previously used by the application module, the second authenticator determines whether the user ID in the certification information is registered in the second authenticator,
- wherein, in response to the second authenticator determining that the user ID is registered in the second authenticator, the second authenticator authenticates the user, authenticated by the first authenticator, to instruct the application module, and
- wherein the application module processes the image data stored in the image data storage unit by accessing the image data storage unit based on an instruction from the user authenticated by the second authenticator.

9. A non-transitory computer-readable storage medium storing a program to cause an information processing apparatus to perform a user authentication method, wherein the information processing apparatus includes a first authenticator, a processor, an application module configured to perform a process, a second authenticator configured to authenticate a user, authenticated by the first authenticator, to instruct the application module, and an image data storage unit, the user authentication method comprising:
- authenticating, via the first authenticator, the user of the information processing apparatus to use a function of the information processing apparatus;
- generating, via the processor and in response to authentication of the user by the first authenticator succeeding, certification information that includes a user identification (ID) and authentication method information to identify an authentication method used by the first authenticator;
- determining, via the application module and in response to the user, authenticated by the first authenticator, instructing the application module to perform the process, whether the authentication method information matches an authentication method previously used by the application module; and
- storing image data in the image data storage unit,
- wherein, in response to the application module determining that the authentication method information matches an authentication method previously used by the application module, the second authenticator determines whether the user ID in the certification information is registered in the second authenticator,
- wherein, in response to the second authenticator determining that the user ID is registered in the second authenticator, the second authenticator authenticates the user, authenticated by the first authenticator, to instruct the application module, and
- wherein the application module processes the image data stored in the image data storage unit by accessing the image data storage unit based on an instruction from the user authenticated by the second authenticator.

10. The information processing apparatus according to claim 1, wherein the second authenticator is different from the first authenticator and manages user information that is different from that managed by the first authenticator.

11. The information processing apparatus according to claim 1,
- wherein the application module is a plurality of application modules, and
- wherein the second authenticator is configured to perform authentication separately for each application module.

12. The information processing apparatus according to claim 1, where in the authentication method by the first authenticator is one of authentication by collection of a user ID and password, authentication by challenge and response via a server, authentication using an integrated circuit (IC) card, and biometric authentication.

13. The information processing apparatus according to claim 1, further comprising a storage unit configured to store the certification information.

* * * * *